May 24, 1932.  G. W. FITZ  1,859,823
MICROMANIPULATOR
Filed Nov. 1, 1930   3 Sheets-Sheet 1
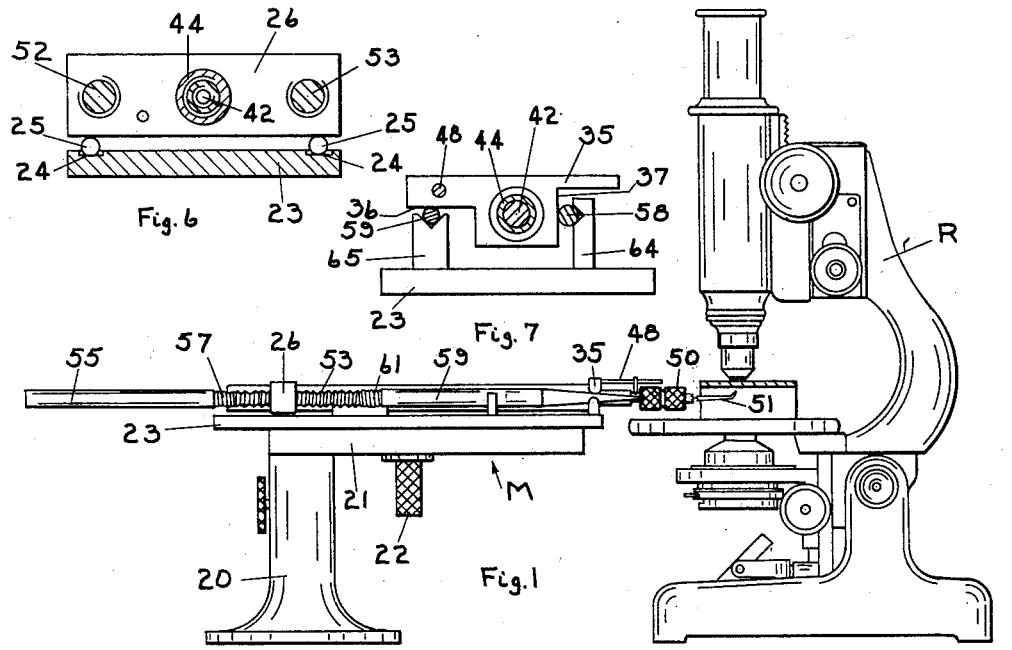
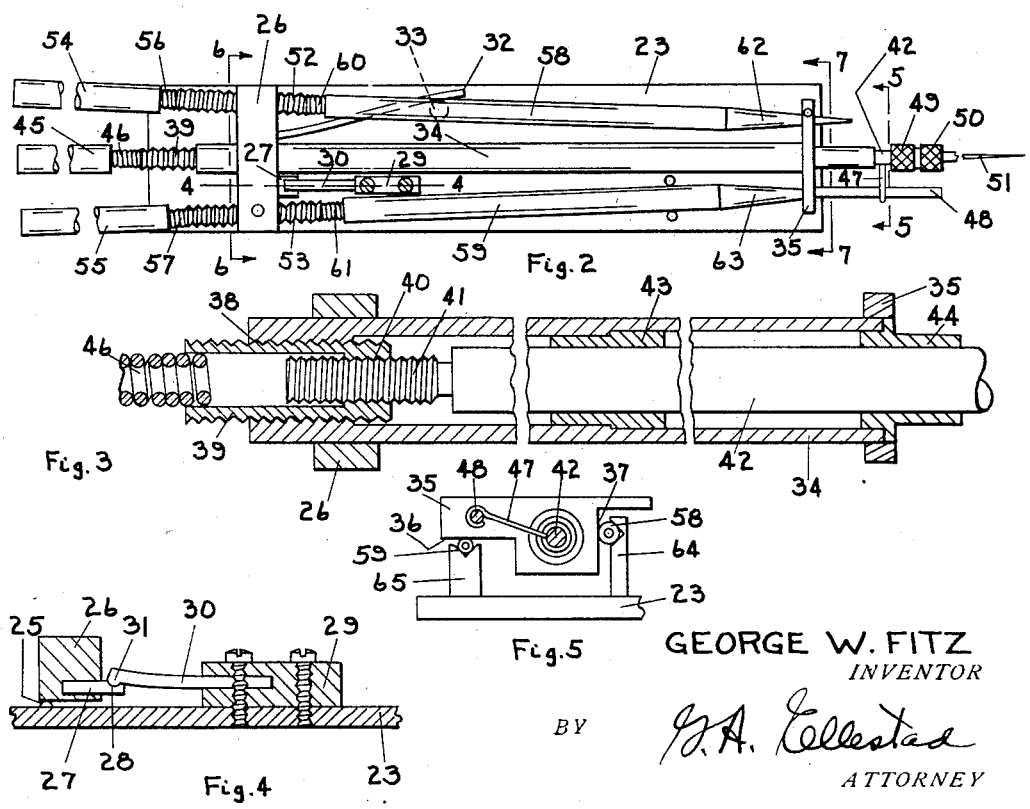
GEORGE W. FITZ
*INVENTOR*
BY  *G. A. Ellestad*
ATTORNEY May 24, 1932. G. W. FITZ 1,859,823
MICROMANIPULATOR
Filed Nov. 1, 1930 3 Sheets-Sheet 2
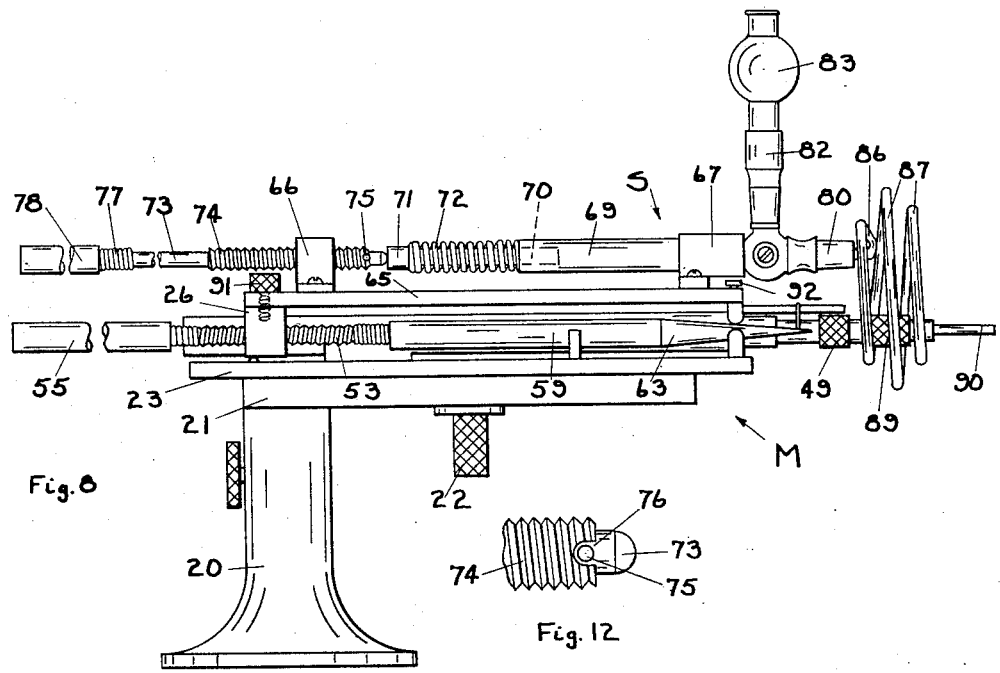
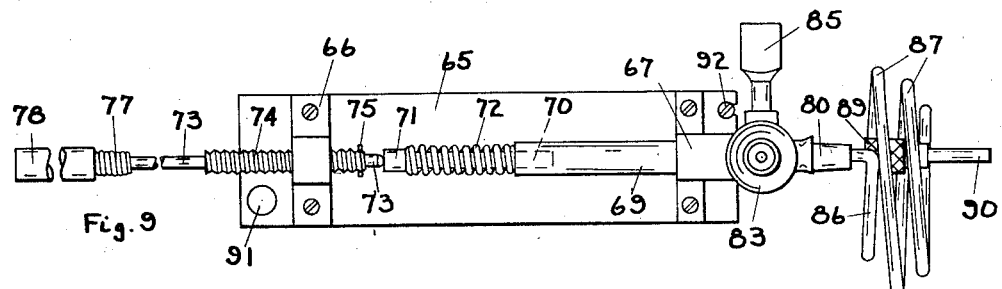
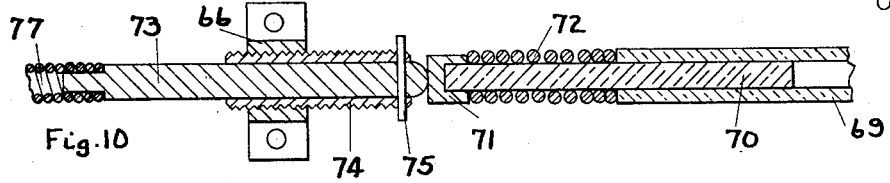
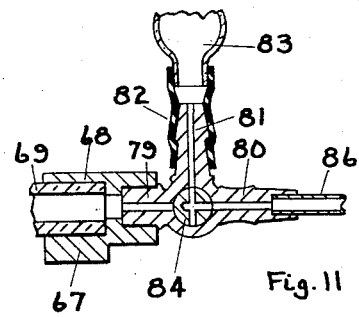
GEORGE W. FITZ
INVENTOR
BY G.A. Ellestad
ATTORNEY Patented May 24, 1932

1,859,823

UNITED STATES PATENT OFFICE

GEORGE W. FITZ, OF PECONIC, NEW YORK

MICROMANIPULATOR

Application filed November 1, 1930. Serial No. 492,725.

This invention relates to devices known as micro-manipulators which are used for handling, manipulating, isolating, dissecting and operating upon microscopic objects such as cells, bacteria, bits of various materials and other objects which are in the field of a microscope.

This application is a continuation in part of my co-pending application Serial No. 383,861, filed August 6, 1929.

One of the objects of my invention is to provide an improved and efficient device of the character described. Another object is to provide a micro-manipulator which will be simple in structure yet efficient in operation so that delicate movements of the operating needle or pipette can be effected with a smooth, steady motion. Another object is to provide an improved syringe which cooperates with the micro-manipulator and can be detachably secured thereto. Still another object is to provide a pair of micro-manipulator units adapted for use, respectively, on the right and left hand sides of a microscope with the operating handles of the manipulators so arranged that when the tops of corresponding handles of each manipulator are moved in the same direction, relative to the operator, the respective pipettes or needles will have the same apparent motion in the field of the microscope. A still further object is to provide a micro-manipulator in which the various operating handles are all arranged so as to be within the grasp of the fingers of the hand whereby the manipulator may be used with great convenience and efficiency. These and other objects and advantages reside in certain novel features of construction, arrangement and combination of parts as will hereinafter be more fully described and pointed out in the appended claims.

Referring to the drawings:

Fig. 1 illustrates one manner of using one embodiment of my invention with a microscope.

Fig. 2 shows a top plan view of my improved micro-manipulator.

Fig. 3 is an enlarged axial sectional view showing the differential screw means.

Fig. 4 is an enlarged sectional view taken on line 4—4 of Fig. 2.

Fig. 5 is a view taken on line 5—5 of Fig. 2.

Fig. 6 is a view taken on line 6—6 of Fig. 2.

Fig. 7 is a view taken on line 7—7 of Fig. 2.

Fig. 8 is a side elevation of my improved micro-manipulator and attached syringe.

Fig. 9 is a top plan view of the syringe.

Fig. 10 is an enlarged horizontal sectional view of the plunger mechanism of the syringe.

Fig. 11 is a sectional view showing details of the stop cock construction.

Fig. 12 is an enlarged view showing a detail.

Similar reference characters refer to similar parts throughout the several views of the drawings.

Figure 13:
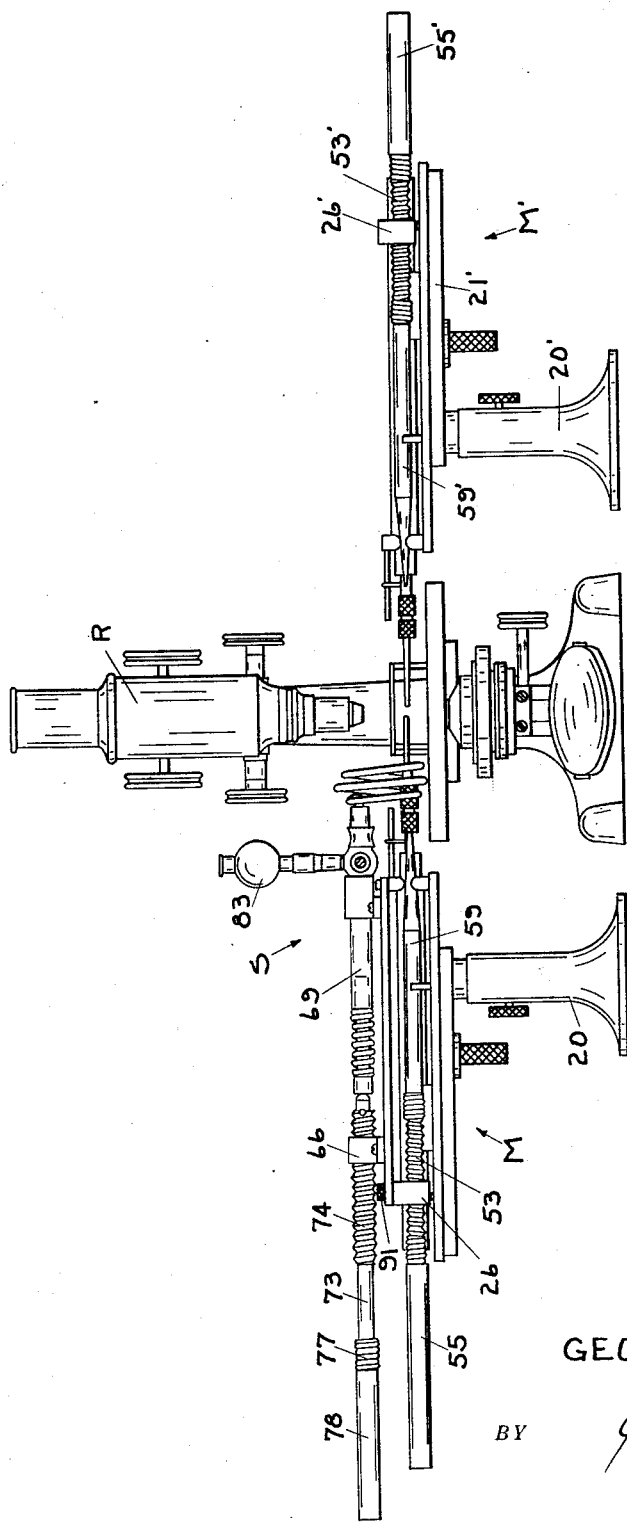
Fig. 13 is a side elevation showing an arrangement for using one of my micro-manipulators on each side of the microscope, with my syringe attached for use.

One embodiment of my invention is illustrated in the drawings wherein M indicates, generally, one of my improved micro-manipulator units. Adjustably mounted on the pedestal 20 is the plate 21 having slots (not shown) by means of which the manipulator unit may be adjusted in a horizontal plane and secured in adjusted position by screw 22. The micro-manipulator unit comprises a base 23, having, adjacent one end, two flat bottomed depressions 24 in which the two steel balls 25 are positioned. Supported on the balls 25 is a block 26 which carries a laterally projecting bearing member 27 having a depression 28. Secured to the base 23 by means of a member 29 is a resilient spring member 30 which has a ball-shaped end 31 adapted to rest in the depression 28. As clearly shown in Fig. 4, the balls 25 provide a fulcrum or horizontal axis about which the block 26 may move in a vertical plane and the spring member 30 tends to urge the block 26 downward toward base 23. The block 26 may also move on balls 25 in a horizontal plane about a vertical axis which is provided by the bearing member 27 in cooperation with the end 31 of spring member 30. The block 26 is urged in one direction in a horizontal plane (toward the top as shown in Fig. 2) by means of a spring 32 having one of its ends fixed to block 26 and a portion adjacent the other end bearing against a post 33 secured to base 23.

One end of a tube 34 is fixed to block 26 while the other end of the tube carries a bearing plate 35 having a horizontal bearing surface 36 and a vertical bearing surface 37. One end of tube 34 has an internal threaded portion 38 with which the screw 39 cooperates. The screw 39 has an internal threaded portion 40 which cooperates with a threaded portion 41 on the reduced end of rod 42 which is slidably supported within tube 34 on the fixed bearing members 43 and 44. The threaded portions of 38 and 39 are cut, for example, to have 32 threads to the inch while the threaded portions 40 and 41 are cut with 40 threads to the inch. This provides a differential screw arrangement by means of which the rod 42 may be moved longitudinally forward and backward by relatively small amounts by rotating the handle 45 which is connected to the screw 39 by means of a resilient, flexible coil spring 46. Rotation of rod 42 is prevented by a suitable key arrangement such as pin 47 having one of its ends secured to rod 42 while the other end is formed into a loop which is slidably mounted on pin 48 carried by plate 35. The free end of rod 42 carries a holder 49 having a tapered slip joint by means of which a holder 50 is detachably secured thereto. The holder 50 may carry any suitable tool 51 such as a needle, pipette or other desired device and it will be obvious from the foregoing that tool 51 may be moved longitudinally, by small amounts, upon turning handle 45.

Threaded through opposite ends of block 26 are the screws 52 and 53 which are connected, respectively, to handles 54 and 55 by means of the flexible coil springs 56 and 57. The other ends of screws 52 and 53 are connected, respectively, to the rods 58 and 59 by means of the flexible coil springs 60 and 61. The rods 58 and 59, which terminate in tapered, conical ends, are provided, respectively, with the cam surfaces 62 and 63. The rod 58 is positioned so that its conical cam surface 62 contacts with the vertical bearing surface 37 on plate 35 and a V-shaped groove in post 64 fixed to base 23, as shown in Fig. 7. The rod 59 has its cam surface 63 in contact with the horizontal bearing surface 36 of plate 35 and a V-shaped groove in post 65 also secured to base 23.

From the foregoing, it will be obvious that when rod 58 is advanced, by turning handle 54, the cam surface 62 will exert a camming action upon bearing surface 37 so that the plate 35 will be moved, against the action of spring 32, horizontally and towards the left as viewed in Fig. 7. Since plate 35 is connected, by tube 34, to block 26, the horizontal motion of plate 35 actually takes place about the vertical axis provided by bearing members 27 and the spring 30. When rod 58 is retracted, the plate 35 will move horizontally in the opposite direction due to the action of spring 32. Similarly, when rod 59 is advanced the plate 35 moves upwardly and its movement takes place about a horizontal axis provided by balls 25 on which the block 26 tilts. Such upward movement is against the action of spring 30 which tends to urge block 26 downwardly towards base 23. Retraction of rod 59 will cause plate 35 to move downwardly due to the action of spring 30.

Since the tool holder 50 and tool 51 are carried by tube 34 which is attached to plate 35, it will be apparent that the movement of plate 35 in vertical and horizontal planes will be imparted to the tool holder 50 and tool 51. Hence the screw-actuated rods 58 and 59, having cam surfaces, provide a means whereby the tool 51 may be moved by small amounts, in vertical and horizontal planes, with a smooth, positive action without backlash. The handles 45, 54 and 55 thus afford means for adjusting the tool 51 longitudinally or in a vertical or horizontal plane. All three adjusting handles are positioned adjacent to each other in substantially the same plane so that they are all within easy range of the grasp of the fingers of the hand. This arrangement affords great ease and convenience in using the device as it eliminates fruitless groping for widely separated adjusting handles and enables the microscopist to secure any desired adjustment of the tool without taking his eye from the microscope to look for the desired adjusting handle. The flexible, resilient connections of the handles provide means for transmitting motion without jarring or disturbing the manipulator.

In working with a micro-manipulator upon certain objects such as cells, for example, the operator often desires to study the results of injecting fluid substances into the cell or withdrawing material from the cell. At other times it is desirable to have an efficient means for separating, collecting or isolating certain microscopic objects from materials such as fluids. These operations can be efficiently carried out by means of my improved syringe, indicated generally at S and shown attached to my micro-manipulator M in Fig. 8. The syringe S comprises the base 65 on which are mounted the blocks 66 and 67, the latter of which has a recessed opening 68 within which is secured a glass tube or cylinder 69. Slidably mounted in cylinder 69 is the ground glass plunger 70 having a metal cap 71 secured to its free end. Surrounding the plunger 70 is a coil spring 72 which tends to urge the plunger out of the cylinder 69 so that the cap 71 bears against the end of rod 73 which is slidably mounted within the central bore of screw 74 threaded in block 66. One end of rod 73 carries a cross pin 75 having projecting ends which are normally positioned within a notch 76 cut in the end of screw 74. Secured to rod 73 by means of a flexible coil spring 77 is the handle 78 by means of which the screw 74 may be turned a slight amount to advance or retract the plunger since the pin 75 in rod 73 engages with the notch 76 in screw 74. If it is desired to move the plunger a relatively large amount the rod 73 may be pushed directly forward whereupon pin 75 moves out of notch 76 so that the screw 74 does not control the movement. Hence it is possible with my syringe to make gross or minute injections of a fluid at will.

Secured to block 67 is a three-way stopcock having the two lateral conduits 79 and 80 and the vertical conduit 81 which is connected by any suitable means, as a rubber tube 82 to a reservoir 83. The rotatable valve member 84, operated by handle 85, permits the operator to selectively fill the syringe with liquid from reservoir 83. Secured to the conduit 80 is a hollow wire 86 which has the convolutions 87 to afford resiliency. The wire 86 is secured to a slip holder 89 so that the free end 90 of the wire projects outwardly and is adapted to hold, by means of a cementitious substance or otherwise, a suitable pipette (not shown). As clearly shown in Fig. 8 the syringe may be detachably secured to my improved micro-manipulator by means of screws 91 and 92 which screw into the block 26 and plate 35, respectively. The slip joint 89 engages the holder 49 on the micro-manipulator so that the pipette which is secured to hollow wire 90 can be adjusted longitudinally, and in vertical and horizontal planes by means of the adjusting handles 45, 54 and 55 of the micromanipulator. All of these adjusting handles are positioned adjacent to the syringe handle 78 and hence the device may be conveniently manipulated because the handles are all within the easy grasp of the fingers of the hand. Gross or minute amounts of material may be selectively injected into or withdrawn by suction from various objects and material under the microscope.

In using my improved micro-manipulator various methods and arrangements may be employed. Thus, as shown in Fig. 1, the device may be used in front of the microscope R although such an arrangement is probably unusual. A more commonly used arrangement is illustrated in Fig. 13 wherein the two micro-manipulators M and M' are arranged on the two sides of the microscope so that manipulators M and M' can be adjusted, respectively, by the right and left hands of the operator while in position to use of the microscope. My improved syringe S is shown attached to manipulator M so that the syringe may also be adjusted with the operator's right hand.

When using a micro-manipulator on each side of the microscope, as shown in Fig. 13, confusion and inconvenience are eliminated by providing proper coordination of the movement of the operating handles with the resultant apparent movements of the operating tools or points. Thus when operating one manipulator with the right hand and another with the left hand, great ease and convenience are afforded if the motion, toward the operator, of the tops of the corresponding operating handles of the two manipulators produces the same effect on the operating needle or point as seen in the microscope. Referring to Fig. 13, for example, when the top of adjusting handle 55 moves toward the operator the operating tool or point moves in a vertical direction and when the top of adjusting handle 55' moves toward the operator the other operating tool or point also moves in the same direction. When the top of adjusting handle 54, of manipulator M, moves toward the operator the operating point or pipette appears in the microscope to also move horizontally toward the operator. The corresponding movement of the corresponding handle of manipulator M' also produces the same effect. Similarly, when the top of the operating handle 45 of manipulator M is moved towards the operator to move the differential screw for adjusting the operating point longitudinally, the operating point appears, in the microscope, to move to the right. Likewise, when the top of the corresponding handle of manipulator M' is moved toward the operator, the operating point also appears, in the microscope, to move to the right.

This highly desirable coordination of handle movements, which is a feature of my invention, is attained by employing different types of screw threads on the corresponding parts which are used on right and left hand manipulators. Thus the manipulator M, shown in Figs. 1, 2 and 13, is adapted for use on the right hand side of the microscope. On this manipulator the screws 52 and 53 have left-hand threads and threaded portions 40 and 41 on the differential screw arrangement are also left-hand threads. The other corresponding manipulator M', shown in Fig. 13, is adapted for use on the left side of the microscope, as seen by the microscopist. On the manipulator M' the corresponding screws 52' (not shown) and 53' have right-hand threads and the corresponding differential screw arrangement has left-hand threads. The screw 74 on syringe S preferably has right hand threads.

It will be understood, from the foregoing, that a micro-manipulator adapted for use on the right side of a microscope is slightly different in certain details from the micro-manipulator which is adapted for use on the left side of the microscope. The corresponding handles 55 and 55', for vertically adjusting the respective operating tools or points, are arranged on the two manipulators M and M' so that they are on the side remote from the operator. At times, a single micro-manipulator may be used either in front of or at either side of a microscope. My improved syringe S, for effecting gross or minute injections or aspirations, can, of course, be detachably secured to either manipulator M or M'.

From the foregoing it will be apparent that I am able to attain the objects of my invention and provide an efficient and improved micro-manipulator unit and an improved syringe unit for use therewith. The terms tool, needle, pipette, operating point and the like, as used throughout the specification and claims all refer to any suitable form of operating or manipulating device which might be used. Although my micro-manipulator has a relatively simple mechanical structure, it is highly efficient in operation as the operating tools or points can be adjusted longitudinally, vertically and horizontally by minute amounts. These adjustments are effected with a smooth, positive action which is free from backlash. The adjusting handles are grouped together and they are all connected to the actuating members by means of flexible coil springs which transmit the motion applied to the handles but eliminate jarring of the manipulator.

The coordinations of the adjusting handles to the apparent movement of the operating points afford great convenience, when using the manipulator. My improved syringe also provides a convenient and easily operated means for injecting or aspirating gross or minute amounts of material. By means of my syringe and manipulator, drops of fluid containing minute organisms such as bacteria, protozoa and the like can be rapidly searched and the desired organisms can be isolated and separated from the fluid by accurately controlled suction of the syringe. My micro-manipulator can also be used in fields other than those of physiology and biology as it finds uses in the study of the physical and chemical characteristics of small specks or particles of various materials.

Various modifications can obviously be made without departing from the spirit of my invention as hereinbefore described and pointed out in the appended claims.

I claim:

1. A micro-manipulator comprising a base, a tool holder movably mounted on said base and means for moving said tool holder, said means comprising a movable member having a cam surface operatively associated with said holder.

2. A micro-manipulator comprising a base, a tool holder movably mounted on said base, means for moving said holder, said means comprising a movable member having a cam surface which operatively engages said holder.

3. A micro-manipulator comprising a base, a tool holder mounted to turn about horizontal and vertical axes on said base, means for moving said holder about said axes, said means comprising movable members having cam surfaces which operatively engage said holder.

4. A micro-manipulator comprising a base, a tool holder movably mounted on said base, cam means for moving said holder, screw means and resilient, flexible means connecting said cam means and said screw means whereby motion of said screw means is transmitted to said cam means.

5. A micro-manipulator comprising a base, a block movably mounted on said base, a tool holder secured to said block, means carried by said block for moving said holder vertically, horizontally and longitudinally.

6. A micro-manipulator comprising a base, a block mounted on said base to turn about a horizontal axis, yielding means tending to urge said block downward, a screw-actuated cam member for adjusting said block in a vertical plane and a tool holder carried by said block.

7. A micro-manipulator comprising a base, a block movably mounted on said base, a tool holder secured to said block, a cam member for moving said holder, means carried by said block for moving said cam member and resilient, flexible means connecting said first mentioned means and said cam member.

8. A micro-manipulator comprising a base, a tool holder movably mounted on said base, a rod secured to said holder, means for adjusting said holder, said means comprising a differential screw connected to said rod.

9. A micro-manipulator comprising a base, a tool holder movably mounted on said base, differential screw means for adjusting said holder longitudinally, an operating handle and flexible, resilient means connecting said handle and said screw means.

10. A micro-manipulator comprising a base, a block mounted on said base to turn about a horizontal axis and a vertical axis, a tube having one end secured to said block, a tool holder carried by said tube, a bearing plate secured to the other end of the tube, said plate having vertically and horizontally disposed bearing surfaces, and cam members contacting respectively with said surfaces for moving said tool holder in vertical and horizontal planes.

11. A micro-manipulator comprising a base, a tool holder adjustably mounted on said base, means for adjusting said holder vertically, horizontally and longitudinally, said means comprising a plurality of devices having handles, said devices being positioned substantially in the same plane with their handles adjacent to each other whereby all the handles will be within the range of grasp of the fingers of the hand of an operator.

12. A micro-manipulator comprising a base, a block movably mounted on said base to turn about vertical and horizontal axes, a tool holder mounted on said block, screw means carried by said block for moving said holder longitudinally and movable cam members carried by said block for adjusting said holder vertically and horizontally.

13. A micro-manipulator comprising a base, a block mounted on said base to turn about vertical and horizontal axes, a tube having one end secured to said block, a tool holder carried by said tube, means secured to said tube for moving said tool holder longitudinally, a bearing plate secured to the other end of said tube, said plate having vertical and horizontal bearing surfaces, two screws threaded in said block, a rod secured to each of said screws, each rod having a tapered end contacting, respectively, with said bearing surfaces for moving said tool holder in vertical and horizontal planes.

14. A device of the character described having in combination a micro-manipulator unit having a holder and means for adjusting same, a syringe detachably secured to said unit, a pipette holder carried by said first named holder and flexible conducting means connecting said syringe and said pipette holder.

15. A micro-manipulator unit having a holder, means for adjusting said holder, said means having operating handles, a syringe detachably secured to said unit, a pipette holder secured to said first named holder, flexible conducting means connecting said syringe and said pipette holder, said syringe having an operating handle positioned adjacent to said first named handles so that all of the handles are within the grasp of the fingers of the hand.

16. A syringe for micro-manipulators, said syringe having a cylinder and a pipette holder, a reservoir mounted on said syringe and a three-way stop cock connecting said reservoir, cylinder and pipette holder.

17. A syringe for micro-manipulators, said syringe comprising a cylinder, a spring pressed plunger within said cylinder, means for moving said plunger, said means comprising a rod slidably mounted within a screw, means for selectively locking said rod and screw whereby said plunger may be selectively moved a great or minute distance.

18. A syringe for micro-manipulators, said syringe comprising a base, a cylinder mounted on said base, a plunger within said cylinder, a block secured to said base, a hollow screw threaded in said block, a rod slidably mounted within said screw, a spring normally urging said plunger out of said cylinder, said rod being in contact with the end of said plunger, a pin carried by said rod and adapted to normally engage a notch in the screw whereby large or small movements of said plunger may be selectively effected.

19. In combination with a microscope, a micro-manipulator unit having a movably mounted tool holder carrying a tool in the field of the microscope, means for adjusting said tool including an actuating handle and associated mechanism for moving the tool in a direction opposite to the direction of motion of the actuating handle whereby the tool as viewed in the microscope will appear to move in the same direction as the top of the actuating handle moves.

20. The combination of a microscope, micro-manipulator units positioned, respectively, on the right and left hand sides of the microscope, each of said units comprising a movably mounted tool holder and screw actuated means for moving said holder, the unit on the right hand side having a screw provided with left hand threads and the unit on the left side having a screw provided with right hand threads.

21. The combination of a microscope and a micro-manipulator unit, said unit comprising a movably mounted tool holder, actuating means for moving said holder and a movable handle connected with said actuating means, said means transmitting motion to move said tool holder in a direction which is opposite to the direction of motion of the top of said handle.

22. A micro-manipulator comprising a base, a tool holder movably mounted on said base, mechanism for moving said holder, a handle and resilient, flexible means for connecting said handle and said mechanism whereby motion may be transmitted from said handle to said mechanism without jarring said holder.

23. A device of the character described comprising a base, a tool holder movably mounted on said base, a member operatively associated with said holder and means for adjusting said holder, said means comprising a movable element having a cam surface in contact with said member.

24. A device of the type described comprising a base, a block movably mounted on said base, a tube having one end secured to said block, a tool holder mounted on said block, a plate secured to the other end of said tube, a screw threadedly mounted on said block, a rod having a tapered cam surface engaging said plate, and flexible, resilient means connecting said screw and said rod whereby motion may be transmitted from said screw to said rod.

GEORGE W. FITZ.